United States Patent
Del Sesto et al.

(10) Patent No.: US 7,631,338 B2
(45) Date of Patent: Dec. 8, 2009

(54) INTERACTIVE CONTENT DELIVERY METHODS AND APPARATUS

(75) Inventors: Eric E. Del Sesto, Lafayette, CA (US); Charles McCullough, Oakland, CA (US); Christopher Michel, Oakland, CA (US); Timothy V. Travaille, Bellevue, CA (US)

(73) Assignee: Wink Communications, Inc., San Francisco, CA (US)

( * ) Notice: Subject to any disclaimer, the term of this patent is extended or adjusted under 35 U.S.C. 154(b) by 593 days.

(21) Appl. No.: 09/754,650

(22) Filed: Jan. 3, 2001

(65) Prior Publication Data

US 2007/0130581 A1 Jun. 7, 2007

Related U.S. Application Data

(60) Provisional application No. 60/179,825, filed on Feb. 2, 2000.

(51) Int. Cl.
*H04N 7/16* (2006.01)
*H04N 7/10* (2006.01)
*H04N 7/167* (2006.01)

(52) U.S. Cl. .................... 725/146; 725/32; 725/136; 725/145; 380/239

(58) Field of Classification Search ............. 725/136, 725/126, 139, 138, 32, 36, 110, 112, 113, 725/114, 109, 116, 146, 145; 380/239
See application file for complete search history.

(56) References Cited

U.S. PATENT DOCUMENTS

| 4,751,578 A | 6/1988 | Reiter et al. |
| 5,307,173 A | 4/1994 | Yuen et al. |
| 5,334,975 A | 8/1994 | Wachob et al. |

(Continued)

FOREIGN PATENT DOCUMENTS

EP 0 942 595 A2 3/1999

(Continued)

OTHER PUBLICATIONS

Ciciora, Farmer, Large, Adams; Modern Cable Television Technology; Morgan Kauffman Publishers; 1999, p. 101.*

(Continued)

*Primary Examiner*—John W Miller
*Assistant Examiner*—Chris Parry
(74) *Attorney, Agent, or Firm*—Schwegman, Lundberg & Woessner, P.A.

(57) ABSTRACT

Interactive content preservation and customization technology is placed at the broadcast facility to ensure reliable transmission of the interactive content to a local subsystem. An interactive content code detector detects interactive content codes in the video stream at the broadcast facility. The interactive content code detector is placed in the transmission path before the video stream is transmitted to broadcast facility hardware that may strip out, destroy, corrupt or otherwise modify the interactive content and interactive content codes. Once an interactive content code detector detects a code, an interactive broadcast server determines what action to take, and instructs an data insertion unit accordingly. The interactive content codes or interactive content may be placed in a portion of the video that is guaranteed by the broadcast facility to be transmitted, for example, the closed caption region of the vertical blanking interval.

32 Claims, 8 Drawing Sheets

U.S. PATENT DOCUMENTS

| | | | |
|---|---|---|---|
| 5,343,239 A | 8/1994 | Lappington et al. | |
| 5,400,402 A | 3/1995 | Garfinkle et al. | |
| 5,448,568 A * | 9/1995 | Delpuch et al. | 348/423.1 |
| 5,504,896 A | 4/1996 | Schell et al. | |
| 5,539,920 A | 7/1996 | Menand et al. | |
| 5,557,317 A | 9/1996 | Nishio et al. | |
| 5,559,550 A | 9/1996 | Mankovitz | |
| 5,563,648 A | 10/1996 | Menand et al. | |
| 5,583,563 A | 12/1996 | Wanderscheid et al. | |
| 5,585,858 A | 12/1996 | Harper et al. | |
| 5,586,264 A | 12/1996 | Belknap et al. | |
| 5,648,824 A | 7/1997 | Dunn et al. | |
| 5,652,615 A | 7/1997 | Bryant et al. | 348/9 |
| 5,657,072 A | 8/1997 | Aristides et al. | |
| 5,675,373 A | 10/1997 | Joiner et al. | |
| 5,689,799 A | 11/1997 | Dougherty et al. | |
| 5,719,618 A | 2/1998 | Park | |
| 5,721,829 A | 2/1998 | Dunn et al. | |
| 5,729,279 A | 3/1998 | Fuller | |
| 5,734,413 A * | 3/1998 | Lappington et al. | 725/141 |
| 5,768,539 A | 6/1998 | Metz et al. | |
| 5,774,664 A | 6/1998 | Hidary et al. | |
| 5,781,228 A | 7/1998 | Sposato | |
| 5,790,198 A | 8/1998 | Roop et al. | |
| 5,818,440 A | 10/1998 | Allibhoy et al. | |
| 5,818,441 A * | 10/1998 | Throckmorton et al. | 715/717 |
| 5,819,034 A | 10/1998 | Joseph et al. | |
| 5,826,166 A | 10/1998 | Brooks et al. | |
| 5,828,370 A | 10/1998 | Moeller et al. | |
| 5,835,717 A | 11/1998 | Karlton et al. | |
| 5,848,352 A | 12/1998 | Dougherty et al. | |
| 5,850,447 A | 12/1998 | Peyret | |
| 5,861,881 A | 1/1999 | Freeman et al. | |
| 5,872,589 A | 2/1999 | Morales | |
| 5,880,720 A | 3/1999 | Iwafune et al. | |
| 5,931,908 A | 8/1999 | Gerba et al. | |
| 5,937,331 A | 8/1999 | Kalluri et al. | |
| 5,970,206 A | 10/1999 | Yuen et al. | |
| 5,974,222 A | 10/1999 | Yuen et al. | |
| 6,002,393 A * | 12/1999 | Hite et al. | 715/719 |
| 6,006,256 A * | 12/1999 | Zdepski et al. | 725/114 |
| 6,008,802 A | 12/1999 | Iki et al. | |
| 6,018,768 A | 1/2000 | Ullman et al. | 709/218 |
| 6,021,433 A | 2/2000 | Payne et al. | |
| 6,055,560 A | 4/2000 | Mills et al. | |
| 6,061,719 A | 5/2000 | Bendinelli et al. | |
| 6,064,438 A | 5/2000 | Miller | |
| 6,064,794 A | 5/2000 | McLaren et al. | |
| 6,067,107 A | 5/2000 | Travaille et al. | |
| 6,070,186 A | 5/2000 | Nishio | |
| 6,181,335 B1 | 1/2001 | Hendricks et al. | |
| 6,256,785 B1 | 7/2001 | Klappert et al. | |
| 6,295,647 B1 | 9/2001 | Ramaswamy | |
| 6,415,438 B1 * | 7/2002 | Blackketter et al. | 725/136 |
| 6,460,180 B1 | 10/2002 | Park et al. | |
| 6,487,721 B1 * | 11/2002 | Safadi | 725/36 |
| 6,530,082 B1 | 3/2003 | Del Sesto et al. | |
| 6,530,084 B1 | 3/2003 | Del Sesto et al. | |
| 6,615,408 B1 * | 9/2003 | Kaiser et al. | 725/112 |
| 6,725,461 B1 | 4/2004 | Dougherty et al. | |
| 6,799,328 B1 | 9/2004 | Freimann et al. | |
| 7,051,357 B2 * | 5/2006 | Carr | 725/110 |
| 7,069,571 B1 * | 6/2006 | Del Sesto et al. | 725/14 |

FOREIGN PATENT DOCUMENTS

| | | | |
|---|---|---|---|
| EP | 942595 | A2 | 9/1999 |
| EP | 1117257 | A2 | 7/2001 |
| WO | WO-9718669 | A1 | 5/1997 |
| WO | WO-9800974 | A1 | 1/1998 |

OTHER PUBLICATIONS

Search Report PCT/US01/03591.

Gibilisco, Stan, *The Illustrated Dictionary of Electronics*, 7th ed., McGraw-Hill Companies, Inc.,(1997), p. 601.

"U.S. Appl. No. 09/333,724 Non Final Office Action mailed Jan. 4, 2005", 23 pgs.

"U.S. Appl. No. 09/333,724 Non Final Office Action mailed Apr. 19, 2007", 21 pgs.

"U.S. Appl. No. 09/333,724 Non Final Office Action mailed Aug. 12, 2005", 22 pgs.

"U.S. Appl. No. 09/333,724 Response filed Apr. 4, 2005 to Non Final Office Action mailed Jan. 4, 2005", 13 pgs.

"U.S. Appl. No. 09/333,724 Response filed Jul. 18, 2006 to Non Final Office Action mailed Aug. 12, 2005", 16 pgs.

"U.S. Appl. No. 09/333,724 Response filed Jul. 19, 2007 to Non Final Office Action mailed Apr. 19, 2007", 13 pgs.

"Notice of Allowance Mailed Sep. 19, 2007 in U.S. Appl. No. 09/333,724", NOAR,6 pgs.

Evain, J.-P., The Multimedia Home Platform—an overview, EBU Technical Department Review—Spring 1998.

ntl Group Ltd. 2000, Interactive Digital Television [online], [retrieved on Nov. 21, 2000]. Retrieved from the Internet ,URL: http://www.ntl.com/guides/digitaltv/interactive.asp>, 2 pages.

Pending United States patent application, "Automated Control of Interactive Application Execution Using Defined Time Periods," U.S. Appl. No. 09/431,001, filed Nov. 1, 1999.

Search Report PCT/US01/03591, Mail Date—May 31, 2001. 5 pages.

Adya, Atul, et al., "FARSITE: Federated, Available, and Reliable Storage for an Incompletely Trusted Environment", *5th Symposium on Operating Systems Design and Implementation*, (Dec. 2002), 1-14.

Anderson, Ross J., et al., "The Eternity Service", *Proceedings of the 1st International Conference on the Theory and Applications of Cryptology (PRAGOCRYPT '96)*, Prague, Czech Republic,(1996),1-11.

ATVEF, "Advanced Television Enhancement Forum Specification (ATVEF), Version 1.1r26", http://web.archive.org/web/20000817083738/http://www.atvef.com/library/spec11a.html, (1999), 1-38.

Back, Adam, "Eternity Service", *Phrack Magazine*, 7(51), http://www.cypherspace.org/adam/eternity/,(Sep. 1, 1997),n. pag.

Batten, Christopher, et al., "pStore: A Secure Peer-to-Peer Backup System", *Technical Memo MIT-LCS-TM-632, MIT Laboratory for Computer Science,*, (Dec. 2001),1-12.

Cooper, Brian, et al., "Creating Trading Networks of Digital Archives", *Proceedings of the 1st ACM/IEEE-CS joint conference on Digital libraries*, (2001),353-362.

Cooper, Brian, et al., "Implementing a Reliable Digital Object Archive", *Proceedings of the Fourth European Conference on Research and Development in Digital Libraries (ECDL)*, (2000),1-11.

Cooper, Brian, et al., "Implementing a Reliable Digital Object Archive (Extended Version)", *Stanford University Technical Report*, (2000),1-13.

Cooper, Brian, et al., "InfoMonitor: Unobtrusively archiving a World Wide Web server", *Stanford University Technical Report*, (2000),1-22.

Cooper, Brian F., et al., "Peer-to-peer data trading to preserve information", *ACM Transactions on Information Systems (TOIS)*, 20(2), (2002),133-170.

Cooper, Brian, et al., "Protecting the PIPE from malicious peers", *Stanford University Technical Report*, (2002),1-10.

Crespo, Arturo, et al., "Cost-driven Design for Archival Repositories", *Proceedings of the 1st ACM/IEEE-CS joint conference on Digital libraries*, (2001),363-372.

Crespo, Arturo, et al., "Modeling Archival Repositories for Digital Libraries", *Proceedings of the 4th European Conference on Research* and *Advanced Technology for Digital Libraries, Lecture Notes in Computer Science*; vol. 1923, (2000),190-205.

Gladney, H. M., et al., "Trustworthy 100-Year Digital Objects: Durable Encoding for When It's Too Late to Ask", http://eprints.erpanet.org/archive/00000007/01/TDO_Durable_final_submission.pdf, Revised Oct. 20, 2004,(Jun. 30, 2003),1-20.

Goldberg, Andrew V., et al., "Towards an Archival Intermemory", *Proceedings of the Advances in Digital Libraries Conference, ADL'98*, (Apr. 22-24, 1998),1-10.

Kamin, Todd, "The Free Haven User Interface: Methods for Inserting and Retrieving Information Stored in Free Haven", *6.199 AUP Final Report*, (May 21, 2000),1-15.

Kubiatowicz, John, et al., "OceanStore: An Architecture for Global-Scale Persistent Storage", *Proceedings of the Ninth International Conference on Architectural Support for Programming Languages and Operating Systems, (ASPLOS 2000)*, (Nov. 2000),1-12.

Maniatis, Petros, "Historic Integrity in Distributed Systems", *Ph.D. Thesis, Stanford University*, (Aug. 2003),1-140.

Rosenthal, David S., et al., "Permanent Web Publishing", *Proceedings of the USENIX Annual Technical Conference, Freenix Track (Freenix 2000)*, (Jun. 2000),129-140.

Tukovinit, Komkit, "Storage-Replication Service in Library 2000", *6.199 Advanced Undergraduate Project*, (Sep. 13, 1994),1-27.

Weatherspoon, Hakim, et al., "Silverback: A Global-Scale Archival System", *Technical Report: CSD-01-1139*, University of California, Berkeley, California,(Mar. 2001),1-17.

Wong, Theodore M., et al., "Verifiable Secret Redistribution for Archive Systems", *Proceedings of the First International IEEE Security in Storage Workshop,*, (Dec. 2002),1-12.

*Advanced Television Enhancement Forum Specification (ATVEF)*, Version 1.1r26, Feb. 2, 1999, pp. 1-37.

Wink Communications, Technical Specification, Subject: 5.2.17 ServerInfo Define, Dec. 31, 1995.

* cited by examiner

| CC1 | CC2 | TEXT 1 | TEXT 2 |

FIELD 1

| CC3 | CC4 | TEXT 3 | TEXT 4 | XDS |

FIELD 2

CLOSED CAPTION LINE

*FIG. 5*

INTERACTIVE CONTENT DELIVERY METHODS AND APPARATUS

CROSS-REFERENCE TO RELATED APPLICATION

The present application claims priority from U.S. Provisional Patent Application Ser. No. 60/179,825, entitled "Synchronizing the Delivery of Digital Information—Interactive Applications, Data, and/or Content—With Broadcast Television Programs and Advertisements", filed on Feb. 2, 2000.

FIELD OF THE INVENTION

The present invention relates to the field of interactive television, and, more specifically, to synchronizing and customizing interactive content.

BACKGROUND OF THE INVENTION

Delivery of interactive content with broadcast programming presents several special issues. First, for the interactive content to be effective, it should be synchronized with the broadcast. This entails delivering an interactive complement to an advertisement at the same time that the broadcast advertisement airs, or coordinating interactivity with events in the ad.

Second, the delivery of interactive content should be reliable. Since the interactive content is broadcast in a data stream parallel to the video stream, there is the possibility that the interactive content might be stripped out or corrupted at the broadcast site, or at the local subsystem, such as a local network affiliate or a cable headend. Finally, it is often desirable to target the interactive content to the specific viewer or delivery system. Digital cable systems, for example, have much higher bandwidth for delivering interactive content than the limited bandwidth provided by the vertical blanking interval (VBI) data transmission methods available to analog cable systems. It is advantageous to build a system that selectively utilizes this higher bandwidth when present in the broadcast environment. Additionally, demographic factors might motivate targeting different interactive content to different delivery systems.

BRIEF DESCRIPTION OF THE DRAWINGS

FIG. 5 is a block diagram of a closed caption line with interactive content codes, in accordance with an embodiment.

DETAILED DESCRIPTION

Figure 1:
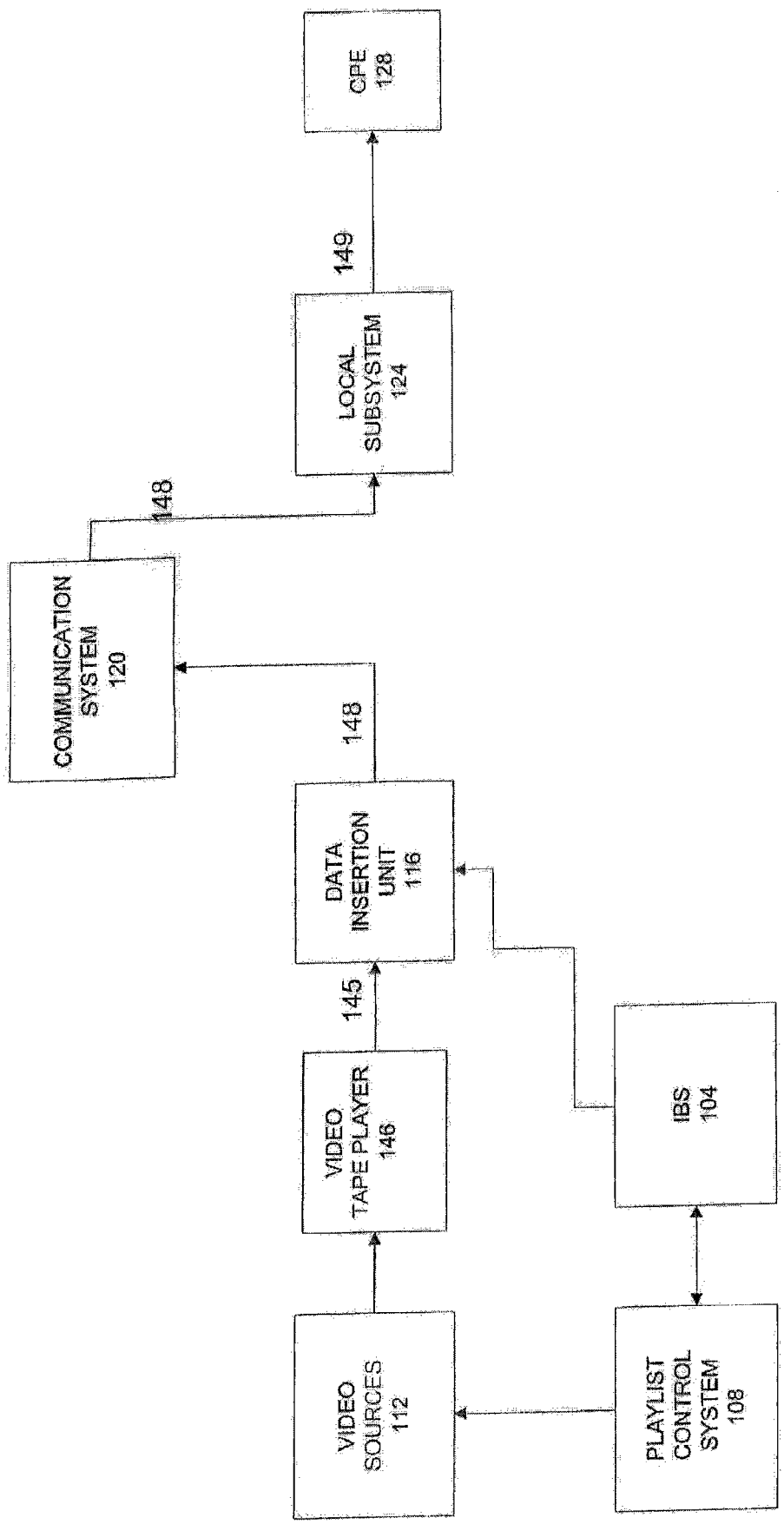
FIG. 1 illustrates a block diagram of an interactive content delivery system.

A first order approach, as described in co-pending application 09/333,724, entitled "Automatic Control of Broadcast and Execution of Interactive Applications to Maintain Synchronous Operation With Broadcast," filed Jun. 15, 1999, assigned to the assignee of the present application and which is hereby incorporated by reference, involves the placement of an interactive broadcast server (IBS) at a broadcast facility to insert interactive content into a video stream. This server utilizes the network playlist system or other program identifying techniques in order to insert the appropriate interactive content for the current broadcast program or segment. A broadcast facility using this technology is illustrated in FIG. 1.

The broadcast facility uses various equipment along a broadcast facility transmission path to generate, enhance, modify, and transmit a video stream. In one embodiment, a video tape player 146 generates a video stream 145 from video sources 112, and places the stream 145 on the transmission path. A server module (software application) running on the IBS (interactive broadcast server) 104 receives real-time information on the current video program being broadcast from a playlist control system 108. The playlist control system 108 controls the sequencing of the video sources 112, which are typically pre-recorded video content (such as programs and advertisements). The IBS 104 uses the playlist information to retrieve an interactive content and uses a data insertion unit 116 to insert a retrieved interactive content or data into the video stream 148. In some systems, the sequencing of pre-recorded video content is performed manually or program information is pre-recorded on the video and detected by the IBS 104 (for example, through VBI encoding of an interactive content identifier).

In an alternate embodiment of this interactive content delivery system, tapes are pre-prepared with interactive content and placed in the video source. A video tape player 146 plays the prepared tapes to generate a video stream with interactive content, and the interactive content is then delivered to the local subsystem 124. In this embodiment, the interactive content is pre-stored in a vertical blanking interval, for example, in VBI line 15, and an IBS 104 may not be used. In either embodiment, the combined video and interactive content stream 148 is then delivered to a communications system 120 (typically via satellite), to a local subsystem (such as a local network affiliate) 124 where the interactive content is then either delivered over the air through an antenna 149, to an interactive customer premise equipment (CPE) 128, i.e. a set top box or similar device, or over a cable system 149 that re-retransmits the local signal to a CPE 128.

While the above system can provide both synchronization and data reliability, some problems remain in ensuring that interactive content reaches its final destination due to broadcast facility or local subsystem equipment used along the transmission path. For example, many networks have multiple feeds to provide time shifted delivery of content for appropriate time zones. The equipment used by the broadcast facility to record and replay video content for different time zones may inadvertently delete, corrupt, or otherwise effectively modify (corrupt) the inserted interactive content. Also, broadcast facilities may have the ability to visually shrink a broadcast signal to allow the broadcaster to insert their own video content, e.g., a stock ticker, into the broadcast signal. This insertion process may destroy the interactive content that is already encoded in the broadcast signal. Further, a broadcast facility may convert an analog broadcast signal to provide digital signals to subscribers. However, as the analog-to-digital conversion equipment is typically located downstream of the point where interactive content is added to the video stream, the conversion equipment may corrupt the interactive content encoded in the signal. In general, any device that modifies the video stream may corrupt or destroy interactive content.

Additionally, local subsystems 124 may also inadvertently corrupt inserted interactive content along a local subsystem transmission path, similar to the broadcast facility transmission path. Video manipulation in both paths can result in the loss of interactive content. For example, a local subsystem may choose to time shift a video stream by a half-hour to suit its own programming choices. In this situation, the equipment used to tape and delay the video stream may inadvertently corrupt the inserted interactive content or simply not re-record it. Also, a local subsystem 124 may insert their own content into a video stream, for example, identifying call letters. The equipment used to insert this content may inadvertently corrupt the inserted interactive content. Thus, a system is needed to ensure the delivery of the desired interactive content to end users.

SUMMARY OF INVENTION

Embodiments of the inventive subject matter provide technology for ensuring reliable transmission of interactive content. This is achieved through the insertion of interactive content codes in the video signal at certain points in the path, which the video takes from the broadcast origination to the customer premise equipment. Servers co-located at the broadcasting facility bridge around the hardware that may destroy the interactive content, in an embodiment, and may detect the interactive content codes and use the codes as triggers for the blocking, re-inserting, or substituting of interactive content in the transmission path.

Interactive Content Preservation at the Broadcast Facility

In a preferred embodiment, this technology is applied to solve the problem where interactive content is deleted, destroyed, corrupted, striped out or otherwise modified ("corrupted") during the transmission path of the broadcast facility due to processing of the video stream carrying the interactive content prior to transmission of the video stream, i.e. to a satellite or other transmission means. More specifically, interactive content codes preferably comprise fields including unique identifiers specifying a single interactive content, or a class of interactive content. The identifiers may identify interactive content or other types of content such as hyperlinks or URLs. Additionally, interactive content codes may be the interactive content themselves. In this embodiment, the interactive content carries the information required to provide identification or customization. The interactive content codes also preferably comprise timing information indicating the length of time that the interactive content should be inserted and conditional information to be used by the local interactive broadcast server to determine appropriate action regarding an interactive content.

In this embodiment, interactive content codes are inserted into a video signal to be broadcast to ensure the reliable delivery of the interactive content. The interactive content codes are placed in the video stream either in prepared videos or through an interactive content insertion process. Then, an interactive content code detector detects the interactive content codes in the video stream at the broadcast facility. The interactive content code detector is preferably placed in the transmission path before the video stream is transmitted to broadcast facility hardware that may strip out or corrupt the interactive content codes; for example, in a position before video compression broadcast facility hardware. Once the interactive content code detector detects a code, an interactive broadcast server determines what action to take, and provides data to a data insertion unit accordingly. In one embodiment, the interactive content code identifies an interactive content that should be inserted into the video stream to accompany the broadcast program. In this embodiment, the interactive broadcast server provides the identified interactive content to the data insertion unit which inserts the interactive content into the video stream at a point in the broadcast facility transmission path subsequent to the broadcast facility hardware that may corrupt or delete the interactive content. Thus, in this embodiment, the present invention ensures that interactive content will be delivered to a local subsystem even in an environment in which the broadcast facility maintains equipment that may delete or corrupt the interactive content.

An alternative embodiment solves the problem of video content being corrupted in the pre-transmission processing path by using interactive content codes placed in portions of the video that are guaranteed to be preserved. In this embodiment, the broadcast facility may destroy interactive content and/or interactive content codes as the video stream is being generated or at some early point thereafter. Thus, in this embodiment, the interactive content codes or interactive content are placed in a portion of the video that is guaranteed by the broadcast facility to be transmitted. For example, in one embodiment, the interactive content is placed in the VBI region used for closed captioning. This VBI region has traditionally been required to contain closed caption information for transmission to end users and therefore almost all broadcast equipment is designed to preserve this VBI region. Thus, in one embodiment, interactive content codes are placed in the closed caption region of the VBI and therefore are preserved by the broadcast facility itself, and an interactive broadcast server is used as described above to insert the interactive content into the video stream at a point beyond where broadcast facility equipment may delete or corrupt the signal. Thus, this embodiment preserves interactivity even if the broadcast facility corrupts the video signal at the video stream generation point or early in the transmission path.

Interactive Content Preservation at the Local Subsystem

Local subsystems also maintain equipment that may destroy interactive content. Accordingly, in another embodiment, a local interactive broadcast server is placed at a local subsystem to provide reliable interactive content transmission. The local interactive broadcast server may also be used to provide content customized for the local subsystem. In a preferred embodiment, interactive content codes are placed in the broadcast signal as described above. The codes are preferably placed in a portion of the broadcast signal that is not typically altered by the local subsystem, such as closed caption region of the VBI, also as discussed above. Thus, if the local subsystem destroys any interactive content, the interactive content code remains on the video signal. The local interactive broadcast server then decodes the interactive content identification code to determine whether an interactive content should be inserted, replaced, passed through or removed from the broadcast signal. Alternatively, an interactive content code detector is coupled in parallel to the transmission path of the local subsystem prior to the local subsystem equipment that may delete or corrupt the interactive content code. In this embodiment, the interactive broadcast server determines whether to insert, replace, pass through, or remove an interactive content responsive to the detected interactive content codes and inserts or replaces the interactive content into the transmission path at a point after the equipment that may delete the content is coupled. As the interactive content detection technology is placed upstream of potential interactive content destroying local subsystem equipment, the content codes in this embodiment may be placed in VBI regions other than the closed caption region.

Local Subsystem Digital Interactive Content Preservation

In another embodiment, the current invention may be used to preserve content in systems where the interactive content and video are initially provided in digital format. In this embodiment, the interactive content code is extracted by an MPEG or similar decoder at the beginning of the transmission path. The interactive broadcast server identifies the new interactive content based on the code and provides this content to a data multiplexer that inserts the identified interactive content into the transmission path and typically, at the beginning of the transmission path (i.e. before the satellite uplink). In addition to satellite, the transmission path may include cable or terrestrial (i.e. HDTV).

I. Interactive Content Preservation and Customization at the Broadcast Facility

A. Interactive Content Preservation at the Broadcast Facility

Figure 2:
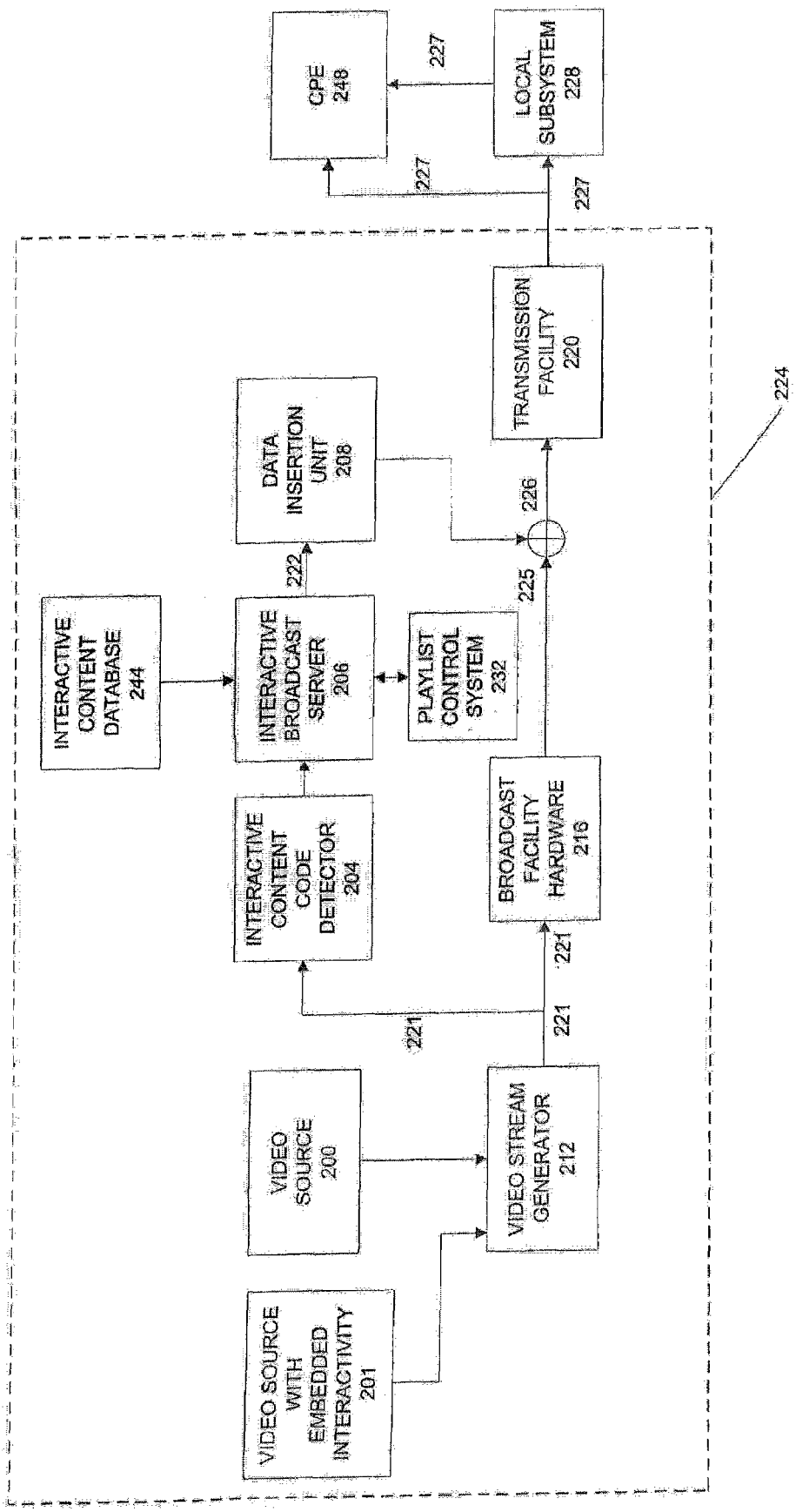
FIG. 2 is a block diagram of an interactive content delivery system with interactive content preservation technology, in accordance with an embodiment.

FIG. 2 is a block diagram of an interactive content delivery system with interactive content preservation technology. In a broadcast facility 224, a video source 200 is coupled to a video stream generator 212. A broadcast facility 224 may be a broadcast network site, a cable network site, or any other site that broadcasts programs and advertisements for view by end users with a customer premise equipment CPE 248. The broadcast facility 224 may broadcast directly to the end user; but may also have its signal relayed through intermediaries such as a local subsystem 228 until the signal 227 reaches its final destination of an end user. The video source 200 may comprise video tapes, UNIX™ files, or the like, that store programs and advertisements as is known in the art. In one embodiment, the video source 201 contains interactive content. In this embodiment, the interactive content preparer embeds the interactivity into the video source 201 (programs, advertisements, etc.) and thus provides the video source with embedded interactivity 201 to a broadcast facility 224. The embedding process may be accomplished through conventional techniques as is known in the art. Interactive content, as used herein and as discussed, comprises interactive applications and/or interactive content codes, and interactive content may serve the same function as the interactive content codes. Interactive content may also include portions of an existing interactive application.

In one embodiment, the interactive content is stored in a vertical blanking interval of the program or advertisement, for example in vertical blanking interval ("VBI") line 15, although any available portion of the VBI may be used. In this embodiment, a video stream generator 212 retrieves a video source 200, 201 at a predetermined time and generates a video stream 221 from the video source 200. The video stream generator 212 may retrieve the video source 200, 201 in accordance with an optional playlist control system 232 that provides program and advertisement schedule information. In one embodiment, the video stream generator 212 is a video tape player that plays video tape video sources 200, 201 and generates a video stream 221 using a video server, such as the Tektronix(™) Profile Video Server, or the like. The video stream 221 may comprise video, audio, and data streams, as specified in the NTSC, PAL, and MPEG specifications, for example. The video stream 221 is then transmitted to broadcast facility hardware 216. In conventional systems, the broadcast facility 224 typically modifies the video stream 221 prior to transmitting the video stream 221 to the transmission facility 220. For example, a broadcast facility 224 may choose to compress a video signal that occupies lines 22 to 262 in each field of a NTSC video signal to occupy only lines 22-212, and use the newly available 50 lines to display other information to the viewer, such as a stock ticker, sports ticker, or the like. In this embodiment, the equipment 216 used to compress the video signal and insert the additional information may corrupt the interactive content that was embedded in the video source 200. Alternatively, time based corrections (TBC) and frame synchronization equipment may be used by the broadcast facility to replace an entire portion of the VBI, in an attempt to clean up the synchronization pulses used to generate a stable image. This equipment may also destroy interactive content.

Figure 3:
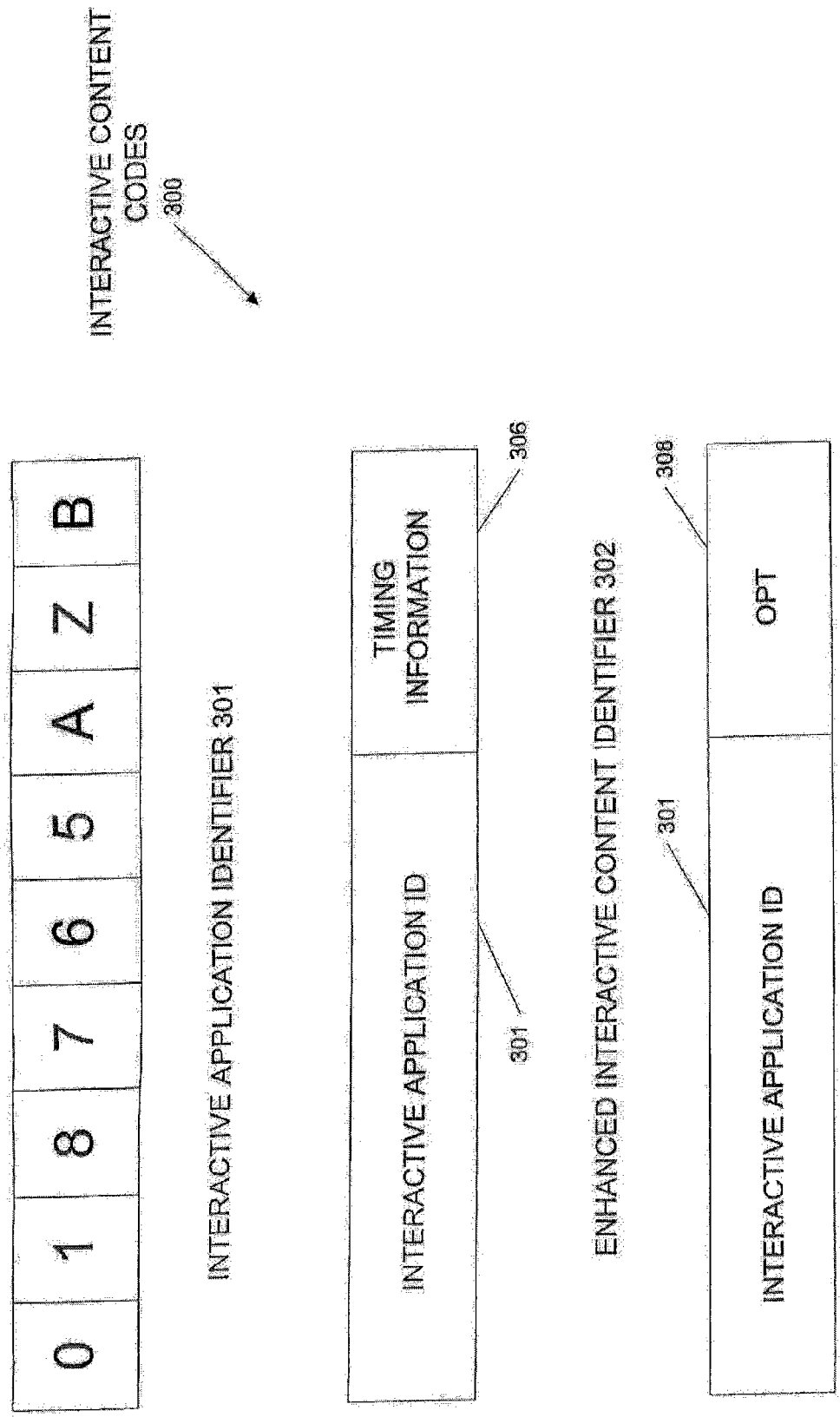
FIG. 3 is a block diagram of various interactive content codes, in accordance with an embodiment.

However, in accordance with the present invention, interactive content codes 300 are placed into a video signal to identify interactive content, and the interactive content embedded video stream 221 is coupled in parallel to an interactive content code detector 204 to detect the presence of the interactive content codes 300. In a preferred embodiment, an interactive content code 300 is inserted into the video source 201 and/or the video stream 221 (by the data insertion unit 208) by an interactive content preparer. As shown in FIG. 3, in one embodiment, the interactive code 300 is an interactive content identifier 301, which is preferably a string of symbols (numbers, letters, binary code, a URL, UIC code, or the like) that identifies a particular interactive content. The interactive content code 300 may be located in the same location in the video source 200, 201 as the interactive content itself, for example, in the VBI of the program or advertisement in which the interactive content is designed to be displayed. For example, if an interactive content is provided in VBI line 15, the interactive content code 300 is also located in VBI line 15. In this embodiment, the interactive content code detector 204 is preprogrammed to examine the VBI line selected for storing the interactive content code 300. An exemplary interactive content code detector 204 would be a VBI line reader as is known in the art, for example, the Norpak(™) TTX-742 VBI Reader and which can be modified to read the specific VBI line that contains the interactive content identifier 501.

In an alternate embodiment, the interactive content identifier 301 is located in a different location than the interactive content. As the interactive content identifier 301 is typically smaller in size than an interactive content, this embodiment allows the interactive content code 300 to be placed in a wider variety of regions in the video source 200, 201. For example, the interactive content code 300 may be placed in a field that may have less bandwidth because of its use to store other information, but is less likely to be deleted than other fields of the VBI; for example, in the closed caption region. As the closed caption region is not intended for large quantities of data, there may not be sufficient bandwidth to store an entire interactive content. However, in this embodiment, the smaller interactive content code 300 is stored in this region without interfering with the closed captioning text and can be transmitted safely, as is discussed in more detail below. Alternatively, the interactive content code 300 is encoded into a parallel data stream that may be broadcast in the transmission path, such as in a separate audio stream, a separate closed caption region (for a digital broadcast signal), a separate address stream, or any other stream separate from the stream used to convey the interactive content. For example, some broadcasts broadcast a separate audio stream (e.g., SAP) along with their programming. In this embodiment, the interactive content codes 300 are embedded in the separate channel, and the interactive content code detector 204 is coupled to the separate audio stream to detect the interactive content code 300. After a code 300 has been detected, the data insertion unit 208 inserts the corresponding interactive content into the broadcast signal, typically at a point in the transmission path after the broadcast facility equipment that may destroy the interactive content is coupled to the broadcast path.

In an alternate embodiment, the interactive content code 300 is an interactive conditional code 303. An interactive conditional code 303 may provide conditional instructions for inserting interactive content into the modified video stream 225, as discussed below. In this embodiment, the interactive code detector 204 reads the interactive conditional code 303 present in the video stream 221. In another embodiment, the interactive content code 300 is contained in an existing interactive content. In this case, the processing of the interactive content code may result in the blocking, substituting, or passing through of the original interactive content.

Once the interactive content code detector 204 has read the appropriate section of the video source 200, 201, the interactive content code 300 is transmitted to interactive broadcast server 206. The interactive broadcast server 206 decodes the interactive content code 300 and determines instructions for providing an interactive content. For example, if the interactive content code 300 is an interactive content identifier 301, the interactive broadcast server 206 decodes the data to identify the interactive content identifier 301. The interactive broadcast server 206 may be a UNIX server, a Windows NT server, or any other similar server executing a process designed to perform the functionality herein. The interactive broadcast server 206 is coupled to a database 244 of interactive content, and retrieves the identified interactive content from the database 244. Then, the interactive broadcast server 206 provides the interactive binary data 222 to a data insertion unit 208 to have the data insertion unit 208 insert the interactive content into corrupted video stream 225. Video stream 225 is the video stream 221 as corrupted by the broadcast facility hardware 216, and thus may or may not retain the interactive content of video stream 221. The data insertion unit 208 is preferably a data insertion unit as is known in the art, such as the Norpak TES-3 Multi Standard Encoder. The data insertion unit 208 overwrites or modifies any ongoing interactive content playback in the video stream 225 to generate an interactive embedded video stream 226. This interactive embedded video stream 226 is sent to a transmission facility 220, which then transmits the interactive embedded video stream 226 to the local subsystem 228 or CPE 248. Thus, in accordance with the present invention, interactive content can be reliably delivered to a CPE 248.

In one embodiment the interactive broadcast server 206 immediately inserts the interactive content as long as the interactive content identifier 301 is detected in the video signal. In an alternate embodiment, an enhanced interactive content identifier 302 also provides timing information 306. Timing information 306 comprises start and stop information, duration information, or start and duration information, or other information useful in determining when to insert an interactive content. Thus, in this embodiment, the interactive broadcast server 206 retrieves the interactive content in accordance with the timing information 306. For example, in an embodiment in which the timing instructions provide start and duration information, the interactive broadcast server 206 has the interactive content inserted at the time indicated by the start time and has the insertion stopped after a period of time corresponding to the duration information. This embodiment ensures that the interactive content are properly synchronized with the programs and/or advertisements to which they relate.

In one embodiment, the interactive content code 300 is placed at the beginning of a program and the timing information 306 is a duration value that indicates how many seconds remain in the program. Thus, the interactive content is started when the interactive content code 300 is detected and is stopped when the duration value expires. In an alternate embodiment, interactive content codes 300 are inserted throughout the program, and the timing information 306 includes a duration value that indicates how long before the next interactive content code 300 will appear. For example, an interactive content code 300 may be inserted every 4 seconds, with a duration of 5 seconds. If after 5 seconds the interactive content code detector 204 has not detected a new interactive content code 300, the program is considered to have ended and the interactive content is stopped. This implementation is useful if the durations of programs are unknown. In a digital environment, certain digital broadcast formats already provide time stamps, and therefore, in these formats the interactive content codes 300 can synchronize the insertion of interactive content through the use of the pre-existing time codes. Alternatively, as digital broadcasts are comprised of and are numbered by frames, the interactive content codes 300 can specify the insertion of interactive content by frame number, e.g., "insert application X at frame 596".

In a further embodiment, the broadcast facility generates digital video signals, and the interactive content code detector 204 is an MPEG decoder, and identifies the corresponding interactive content based on the decoded interactive code. Then, the interactive content code detector 204 provides this content to a data multiplexer or similar device that inserts the identified interactive content into the transmission path. For example, immediately before a satellite uplink, or after a point in the transmission path that contains equipment that might corrupt or otherwise alter the interactive content. The transmission path, however, may also be cable or other terrestrial, i.e. HDTV.

The interactive content code detector 204 is typically coupled to a point in the transmission path prior to the point at which broadcast facility equipment 216 may corrupt the interactive content code 300. The data insertion unit 208 is typically coupled to a point in the transmission path after the hardware 216 is coupled, to ensure the interactive content to be inserted is not deleted. Thus, the present invention enables reliable transmission of interactive content to an end user. In one embodiment, the detector 204 is coupled to the transmission path immediately after a video stream is generated, for example, after a video stream generator 212 or a video source generator is coupled to the transmission path, to ensure that the content code 300 will be detected before being transmitted through hardware that may delete the interactive content code 300. In a further embodiment, the DIU 208 is coupled at a point in the transmission path immediately before transmission, for example, immediately before the transmission facility 220, to ensure that the interactive content will be broadcast to the local subsystem 228. If the broadcast facility does not contain equipment that will destroy the region of data that contains the interactive content code, the interactive content code detector 204 can be coupled to the same point in the transmission path as the data insertion unit 608, which will be after the point at which hardware that will corrupt the interactive content is coupled to the transmission path.

B. Interactive Content Preservation Through Guaranteed Field Selection

Figure 4:
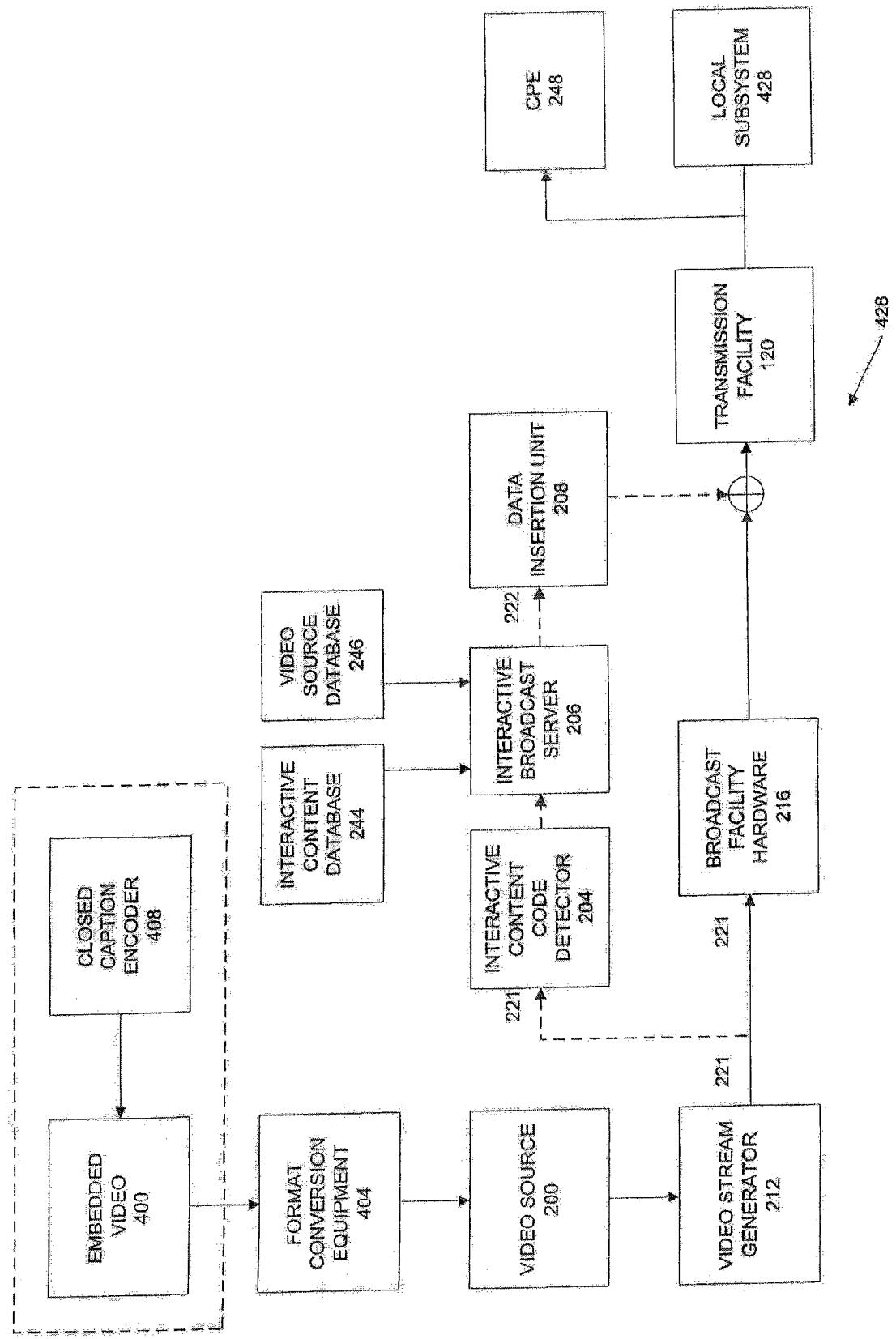
FIG. 4 is an alternate embodiment of an interactive content delivery system with interactive content preservation technology, in accordance with an embodiment.

In one embodiment, interactive content is preserved through the placement of interactive content codes 300 in VBI regions that are preserved by the broadcast facility. FIG. 4 is an alternative block diagram of a broadcast facility 428 in accordance with this embodiment of the present invention. In this embodiment, the video having embedded interactive content 201 is input to format conversion equipment 404 of a broadcast facility 428. The format conversion equipment 404 converts the video into a format compatible with the broadcast facility's video stream generator 212. As different broadcast facilities use different format conversion equipment 404, the interactive content preparer typically prepares video in a single format and allows the broadcast facility to convert the video into the appropriate format. However, format conversion equipment 404 often strips or deletes vertical blanking intervals from a video 400, thereby unintentionally removing interactive content. Additionally, some broadcast facilities broadcast digital signals. In this example, if the video source is analog, then the broadcast facility must convert the analog signal into a digital signal. This process also may strip or delete the VBI or certain VBI lines. Thus, in an embodiment in which interactive content is stored in the VBI (or VBI line), the interactivity may be deleted at this point in the video transmission process. Additionally, the video stream generation equipment 212 may also delete or remove interactive content or codes stored in the VBI. If interactivity is deleted at either of these points, the interactive content code detector 204 will be unable to detect the interactive content code 300.

In accordance with the present invention, an interactive content code 300 is placed the closed caption VBI line, e.g., line 21. As mentioned above, the closed caption line 21 is traditionally preserved throughout transmission. Thus, the broadcast facilities may use special equipment, referred to as a "bridge" (not shown), that explicitly preserves the data in the closed caption line. In this embodiment, the interactive content provider embeds the interactive content code 300 into the closed caption line of the video using a closed caption encoder 408 to create video with embedded interactivity 400. The closed caption encoder 408 is a conventional video encoding device such as the Norpak™ TES-3 or the EEG closed caption encoder, that is designed to encode data in the closed caption line. Once the interactive content code 300 is placed in the closed caption line, the broadcast facility 428 itself will ensure that the content code 300 is preserved throughout the transmission path of the broadcast facility. Thus, the interactive content code detector 204 will be able to detect the interactive content code 300 by reading the closed caption line of the signal 221, and then the interactive broadcast server 206 will be able to insert the corresponding interactive content. The interactive broadcast server 206 may also receive input from a video source database 246. Of course, the interactive content code 300 may identify an application, an embedded program or advertisement, may provide timing information 306, and may provide conditional information 308, as discussed below, to provide on-the-fly adjustments.

FIG. 5 illustrates contents of the closed caption line. As illustrated, the closed caption line comprises two fields, field 1 and field 2. Field 1 has four subfields, closed caption 1, closed caption 2, text 1, and text 2. Field 2 has subfields closed caption 3, closed caption 4, text 3, text 4, and XDS. The closed caption 1 field stores the closed caption information that is displayed on a user's television when the closed caption feature is enabled, i.e., the text of the dialogue occurring in the program or advertisement. The other closed caption fields are used to display alternate languages in the closed caption format. The Text 1, Text 2, Text 3, Text 4, and XDS fields are not specifically required to carry any data; thus, they may be used to carry commercial data such as interactive content identifiers 300 or interactive content. XDS, for example, is specifically designed to carry auxiliary data, and current law requires the transmission of V-chip data in that field. Thus, an interactive content provider can encode its data in any of these fields. It is preferable to store data in Field 1, as that field is the only field that is required to have closed caption information by law and is therefore almost always preserved by the broadcast facility itself. However, either field may be used as it is difficult to accidentally delete one field and not the other. Thus, most equipment that preserves field 1 of the closed caption region will by necessity preserve field 2. Although the above description refers to inserting interactive content into the closed caption line, any VBI line or other region that is preserved throughout the transmission path of a video stream may be used in accordance with the present invention. It is further anticipated that federal law or other regulatory regimes may require preservation of other VBI lines for other purposes, and the present invention may be readily extended to those other lines.

In this embodiment, the interactive content code detector 204 and the data insertion unit 208 may be coupled to approximately the same point in the transmission path of the broadcast facility 224 because the code 300 is guaranteed to be preserved by the broadcast facility equipment. Thus, in this embodiment, the interactive code detector 204 reads a preserved line that has an interactive content code 300, and the data insertion unit 208 inserts the interactive content into a different region that may not have been preserved at the same point at which the code 300 is detected. In this example, the interactive content code detector 204 and DIU 208 are coupled to a point in the transmission path after which broadcast facility equipment that may destroy the interactive content is coupled to the transmission path, to ensure that the inserted interactive content is preserved.

In an embodiment in which references to the interactive content itself (such as a URL) are encoded into VBI line 21, the interactive content code detector 204, interactive broadcast server 206, interactive content 208, and interactive content database 244 may be optionally eliminated. If a URL is used, the interactive content code detector 204 decodes the URL, connects to the database (located remotely or locally) identified by the URL through a communication facility such as a modem, and retrieves the associated interactive content for insertion by the DIU 608. As the interactive content is ensured of its transmission by its placement in the closed caption line, then reinsertion is not necessary. However, if on-the-fly replacement is desired, or if the interactive content is placed elsewhere in the video source 200, 201, then the above equipment would be used to provide the above-described functionality. Thus, this embodiment of the present invention provides further guarantees that an interactive content will be preserved throughout a transmission path until reaching the CPE 248.

C. Customization of Content at Broadcast Facility

Referring to FIG. 3, the system of the present invention may also provide on-the-fly content adjustment. In this embodiment, an interactive conditional code 303 is provided with an interactive content. In an embodiment with video sources embedded with interactivity 201, an interactive content is embedded in the video source 201 and an interactive conditional code 303 is embedded as well. The interactive conditional code 303 preferably specifies an interactive content identifier 301 and an OPT field 308. The interactive content identifier 301, as discussed above, can refer to either an interactive content or a video source embedded with an interactive content 201. The OPT field 308 specifies whether an interactive content may be replaced by the interactive broadcast server 206. If an OPT field 308 indicates that an interactive content cannot be replaced, then the interactive broadcast server 206 knows that no new interactive content is available for that particular video 200. Thus, the use of the OPT field 308 allows the interactive broadcast server 206 to immediately determine whether an interactive content is available for replacement. If the OPT field 308 indicates that an interactive content may be replaced, then the interactive broadcast server 206 determines whether or not to replace the existing interactive content with a different interactive content. For example, if an interactive content is embedded into a video source 201, but the interactive content supplier or the program source determines that a different version should be broadcast, the different version can be stored in database 244, and the interactive broadcast server 206 can replace the existing version of the application with the newer version as identified in the interactive content code 300. For example, an interactive content that relates to a news story may be replaced with a more current version of the interactive content as the news story changes merely by replacing the interactive content at the broadcast facility 224. Thus, the interactive content provider can easily make on-the-fly adjustments to interactive content. In this embodiment, the interactive content provider embeds the original video source 200, 201 with an OPT field specifying that the interactive content can be replaced, along the interactive content identifier. However, the use of an OPT field 308 also allows the interactive content preparer to ensure that interactive content are not replaced by a third party not under the control of the interactive content preparer. The on-the-fly embodiment of the present invention may also be performed without an OPT field. In this embodiment, the interactive broadcast server 206 automatically inserts a latest version of an interactive content upon receipt of an interactive content identifier. The OPT field 308 may also be used to specify conditions for replacement. For example, for a contest interactive content, the field 308 could specify that interactive content be broadcast only if the local subsystem has legalized such contests, as discussed in more detail below. In this case, OPT field 308 will have a numerical value that can be compared to the values known to a local server. The local server determines whether the application should be blocked, passed through, or replaced from the comparison.

II. Interactive Content Preservation at the Local Subsystem

A. Interactive Content Preservation

Figure 6:
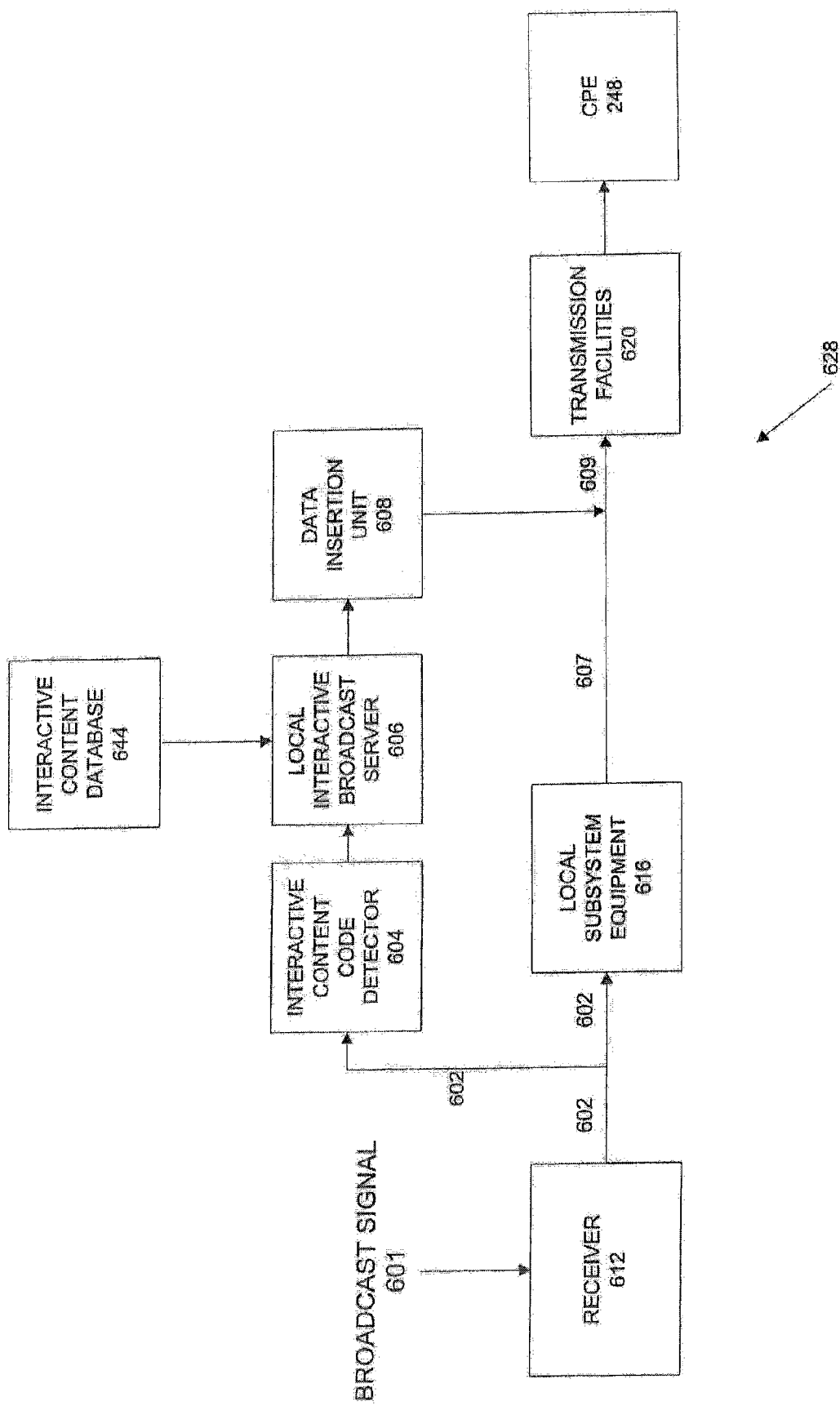
FIG. 6 is a block diagram of a local subsystem with interactive content preservation technology, in accordance with an embodiment.

FIG. 6 is a block diagram of a local subsystem 628 with interactive content preservation technology. In this embodiment, the local subsystem 628 receives a broadcast signal 601 from a broadcast facility and relays the signal 601 to a CPE 248. The local subsystem 628 is typically a local affiliate of the broadcast facility; but the local subsystem 628 could also be a cable headend that receives a broadcast signal 601 from a cable provider or broadcast facility, or local affiliate, or a digital satellite subsystem that receives a signal 601 from a local affiliate, a broadcast facility, or a cable headend. The broadcast signal 601 contains either interactive content, interactive content codes 300, or both. End users receive the broadcast signal 601 on their CPE 648, which may be a television, set top box, or satellite receiving system. The interactive content is displayed along with, or over, the portion of the broadcast signal video.

In accordance with the present invention, interactive content codes are placed in the broadcast signal to ensure reliable delivery of interactive content through the local subsystem 628 to the CPE 648. In one embodiment, the interactive content codes 300 are not located in closed caption VBI line, thus, they may be modified or deleted by the local subsystem 628. As shown in FIG. 6, a receiver 612 at the local subsystem 628 receives the broadcast signal 601. Then, the local subsystem 628 uses local subsystem equipment 616 to perform different operations on the received signal 602. For example, the local subsystem 628 may store a received signal 602 to rebroadcast the signal 602 at a later time. Further, the local subsystem 628 may insert graphics, such as a local station ID, into the signal 602 prior to retransmission. Alternatively, the local subsystem 628 may insert a local commercial into the video stream 602 in a place reserved by the broadcast facility for local insertion. All of these operations may inadvertently destroy the interactive content or a previously inserted interactive content code by modifying or deleting the component of the video signal 602 carrying the interactive content.

In accordance with the present invention, an interactive content code detector 604 is coupled in parallel to video signal 602 to detect the inserted interactive content codes 300. The interactive content code detector 604 may be coupled directly to the output of the receiver 612, or may be coupled further along the transmission path. The interactive content code detector 604 is preferably coupled to the video signal 602 prior to the video signal 602 being transmitted to any local subsystem equipment 616 that may destroy the interactive content code 300. The interactive content code detector 604 detects the interactive content code 300 and provides the code 300 to a local interactive broadcast server 606, which then identifies the interactive content and causes the data insertion unit 608 to reinsert interactive content into the modified video stream 607 at a point in the transmission path after which equipment that may corrupt the interactive content is coupled to the transmission path. The operation of the interactive content code detector 604 in this embodiment of the present invention is substantially similar to the embodiment of the interactive content code detector 204 described above with respect to FIG. 2. In one embodiment, the data insertion unit 608 is coupled to a point in the transmission path immediately before the video signal is broadcast out to the CPEs 648, to ensure that no equipment from the local subsystem will corrupt the inserted interactive content.

Alternatively, in one embodiment, the interactive content provider stores multiple interactive content codes 300 in different fields of the video signal 602 prior to being broadcast to the local subsystem 628 to ensure that one of the interactive content codes 300 is transmitted successfully through the local subsystem 628. As different local subsystems 628 may independently preserve different fields, this method helps ensure that at least one of the interactive content codes 300 present in a broadcast signal is not modified or deleted by the local subsystem 628 and can be detected by the interactive content code detector 604.

In an embodiment in which digital applications are to be inserted into a broadcast digital video stream, the data insertion unit 608 comprises MPEG or other digital format insertion capabilities, as is known to those of ordinary skill in the art. For example, for a MPEG 1 or 2 stream, the interactive broadcast server 606 transmits the interactive content to a local subsystem multiplexer that is generating the MPEG stream. The local subsystem multiplexer typically has a serial or TCP/IP port to receive the interactive content bit stream. Upon receipt of the interactive content bit stream, the multiplexer adds the interactive content into the digital video stream in accordance with its normal operation. The multiplexer can also remove and replace interactive content when appropriate. If the digital stream is Serial Component Digital Video, (a packet-based digital video stream) as specified in the SMPTE 259M-C standard, a Norpak encoder would be used to add the interactive content by replacing the existing packets with the new packets transmitted to it by the local interactive broadcast server 606. Alternatively, if a digital version of an interactive content has been broadcast to an analog subsystem 628, the local interactive broadcast server 606 can swap out the digital application with a lower bandwidth analog application. If an analog version of an interactive content has been broadcast to a digital subsystem 628, the analog version must be converted into a digital program or a digital program must be swapped in place of the analog version. If the analog version is to be digitized, a software analog to digital converter must be used to convert the analog version into a digital program that accords with the local subsystem's protocols. In one embodiment, the local interactive broadcast server 606 supports multiple application delivery to the subsystem 628. For example, a cable headend subsystem 628 may deliver both analog and digital streams to allow homes with digital set tops to receive higher quality interactivity while homes with analog may still receive the simpler interactivity. In this embodiment, the local interactive broadcast server 606 selects both the richer and simpler versions of the interactive content and inserts them into the respective signals.

In an embodiment in which the interactive content codes 300 are placed in a field that is preserved by the local subsystem hardware, for example, in the closed caption line, the interactive content code detector 604 is coupled to the transmission path to detect the interactive content code 300 and then have the data insertion unit 608 insert the interactive content into the video signal at a point in the transmission path after which local subsystem hardware that may corrupt the signal is coupled to the transmission path. In one embodiment, the interactive content code detector 604 and the data insertion unit 608 are coupled to the same point in the transmission path.

Thus, this embodiment of the present invention ensures the successful transmission of interactive content through the local subsystem 628. Of course, the interactive content identifier 300 may identify an application, an embedded program or advertisement, may provide timing information 306, and may provide conditional information 308, as discussed above, to provide the benefits and advantages discussed above.

B. Interactive Content Customization

In an alternate embodiment, the local subsystem 628 also provides customized content.

In this embodiment, interactive content are targeted for a local subsystem 628, providing for a much richer interactive content experience. Conditional fields are provided to allow the local subsystem to perform the appropriate action for the local subsystem. For example, depending on the conditional field and the current configuration of the local subsystem, the local subsystem may disable an existing interactive content, replace an existing application with a customized application, pass through an existing application, or insert an interactive content.

In one embodiment, the local interactive broadcast server 606 inserts a corresponding interactive content into the video signal 607 for either customization or reinsertion purposes. However, in this embodiment, the corresponding interactive content may be a custom interactive content. For example, if a local subsystem 628 determines that the demographics that constitute the viewing region would prefer a different version of an interactive content, the interactive content provider will provide a version of the interactive content suited to the demographics of the local subsystem 628. Alternatively, if the local subsystem 628 has a different bandwidth capability than the bandwidth capability with which the existing interactive content was intended to be used, the local interactive broadcast server 606 can substitute an interactive content designed for the bandwidth capability of the local subsystem 628 for the existing interactive content. For example, if the majority of all end users have low-bandwidth connections, the interactive content provider will typically provide an interactive content designed to be transmitted over the low-bandwidth connection. However, if a specific local subsystem 628 is a high-bandwidth digital cable subsystem, then, in accordance with the present invention, the digital local interactive broadcast server 606 replaces the low-bandwidth interactive content with a digital version of the interactive content, allowing the local subsystem 628 to take advantage of its superior network infrastructure.

In an alternate embodiment, an interactive conditional code 303 is provided in the video signal 601. As discussed above, the interactive conditional code 303 comprises an OPT field 308. The OPT field 308 is set to designate whether an interactive content may be replaced. Additionally, the OPT field 308 may provide information to be interpreted locally for deciding with what content to replace the existing interactive content. For example, the OPT field 308 may have a flag that indicates the type of content being transmitted, a ticker, a contest, an advertisement, or any other type of content or whether the content should be blocked. This content type information can be used by the local subsystem to determine an action. For example, the local subsystem may prohibit advertisements within a program unless they derive revenue from the advertisement. Thus, if a flag indicates an advertisement is being transmitted within a program, the local subsystem may disable the application as discussed below. The interactive content provider typically sets the OPT field 308 of the interactive conditional code 303 to indicate that the interactive content can be replaced, however, use of the OPT field 308 also allows an interactive content provider to ensure that certain applications are not replaced or modified by a local subsystem 628. If the interactive content can be replaced, the interactive content provider sets the parameter for replacing the interactive content in the OPT field 308.

In a preferred embodiment, the interactive content codes 300 may be inserted, as discussed above, into the closed caption region of the VBI, as a code in the video, or encrypted as a unique identifier to prevent "ad skipping" applications from being developed. As discussed above, if the interactive content codes 300 are originally inserted into the closed caption region, the interactive content codes are ensured to be transmitted to the interactive content code detector 604.

Figure 7:
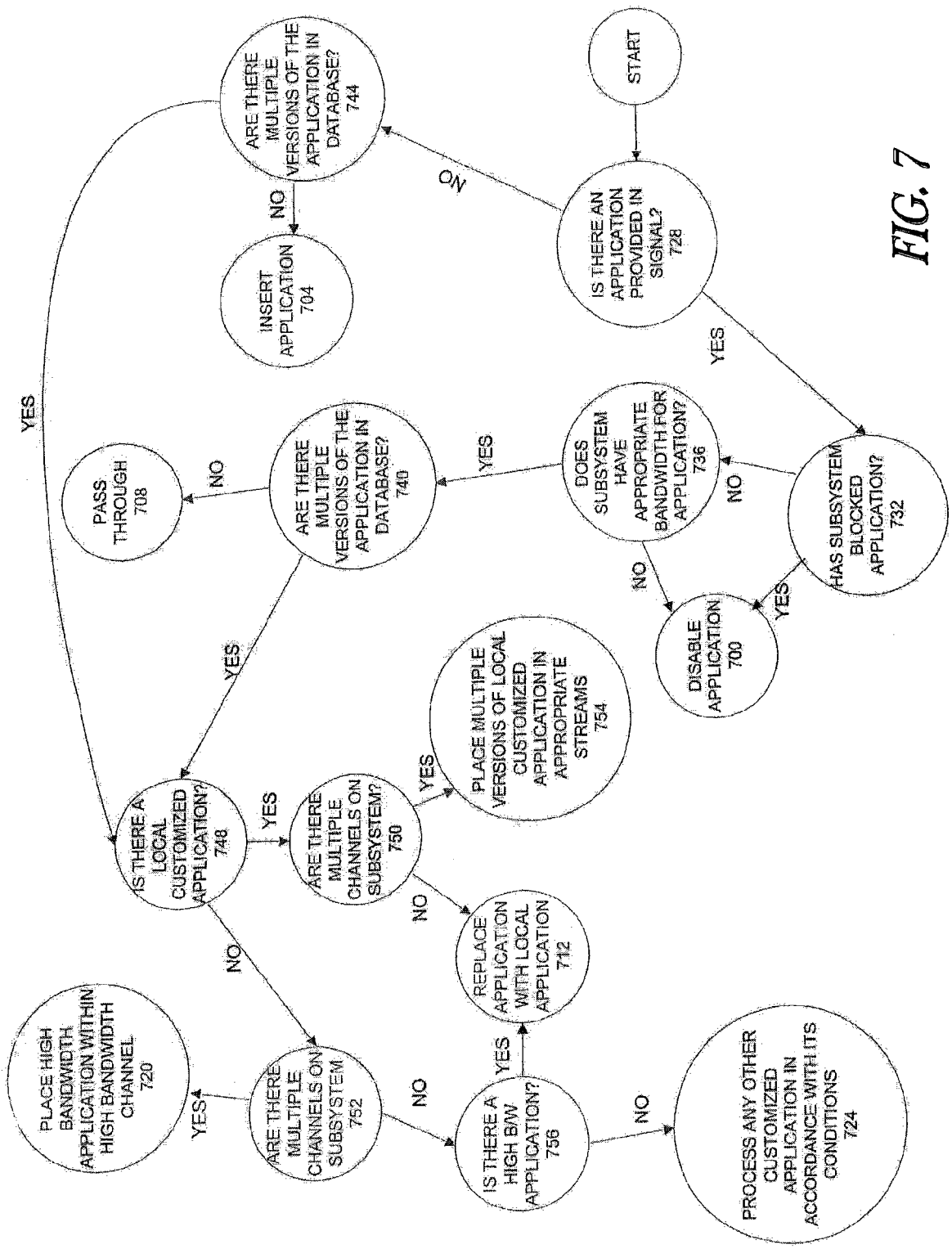
FIG. 7 is a flow diagram of the processing of a local interactive broadcast server, in accordance with an embodiment.

A preferred method of processing interactive content codes 300 is illustrated in FIG. 7. In this embodiment, as discussed above, there are four main actions a local server 606 can take: disable 700 an existing interactive content, insert 704 an application, pass through 708 an existing application, and replace 712, 716, 720, 724 an existing application with a customized application. First, the server 606 at the local subsystem 628 determines 728 whether an interactive content is present in the received signal 601. In one embodiment, the broadcast facility does not insert applications into the video stream 601, allowing the local subsystems 628 instead to provide the insertion. In this embodiment, a interactive content identifier 300 is provided with program or advertisement material to identify the application to be inserted into the video stream 607. Thus, this embodiment eliminates the requirement of having an interactive broadcast server 104 at the broadcast facility. If the interactive content identifier 301 is inserted into the closed caption region of a video source 200, there may be no interactive equipment present at a broadcast facility at all, as the broadcast facility does not have to ensure the preservation of the codes 301 with the interactive content preservation technology described above.

Figure 8:
FIG. 8 is an illustration of local subsystem data structure, in accordance with an embodiment.

If an interactive content is not present in the signal 601, either because the broadcast facility did not insert an application as discussed above or because the broadcast facility deleted or removed the interactive content, then the server 606 determines 744 if there are multiple applications in database 644 corresponding to the interactive content code 300. FIG. 8 illustrates an embodiment of database 644. Database 644 maintains interactive content and database 646 maintains video sources 201 with embedded interactivity. Either or both can be used in accordance with the present invention. The databases 644 are preferably organized by interactive content identifiers to allow the local interactive broadcast server 606 to quickly locate the information and any corresponding applications released to an interactive content. In one embodiment, the database 644 maintains a count field for each interactive content that indicates the number of different versions of an interactive content that are present in the database 644. A count of 2 indicates that an additional version of an interactive content is stored in the database 644. The server 606 locates the count field corresponding to the interactive content code being analyzed and examines the count field to determine whether there are multiple versions of an interactive content. If there are not multiple applications, then the server 606 retrieves the corresponding interactive content and provides it to the data insertion unit 608, which inserts 704 the corresponding application into the video stream 601. The resultant embedded stream 609 is transmitted to the CPE 248 via transmission facilities 620.

If an interactive content is present in the signal, the server 606 determines 732 whether the subsystem 628 has blocked the application. In one embodiment, the local server 606 maintains a list of those applications which are blocked by the local subsystem 628 in database 644. As shown in the example of FIG. 8, these interactive content are identified in the database 644 as being blocked for transmission. Thus, in this embodiment, the local subsystem 628 has control over whether an interactive content is provided to an end user by modifying the list maintained by the server 606. This allows local subsystems 628 to control the content of their transmissions in accordance with viewership preferences, legal issues, or the like. As discussed above, the OPT field 308 specifies the type of interactive content (for example, a contest). In this embodiment, the local interactive broadcast server 606 reads the OPT field 308 and compares the OPT field 308 with local content parameters to determine the broadcast of the application is permitted. The server 606 will look up a corresponding contest field in its database to determine its status. For example, if prize awarding contests are illegal in a subsystem, a contest interactive content will be disabled. This embodiment also allows the local subsystem 628 to gain revenue by retaining a percentage of any revenue generated by an interactive content. For example, if an interactive content is a web site link at which an end user may make a purchase, the local subsystem 628 can require the web site host to pay the local subsystem 628 a percentage of the revenue gained in exchange for permitting the interactive content to be transmitted to the CPE 248. In this embodiment, if no contractual arrangement has been reached with the web site host, a flag on the database 644 will indicate that the local interactive broadcast server 606 should disable the corresponding interactive content.

If a local subsystem 628 has indicated that an interactive content is to be blocked as discussed above, the server 606 disables 700 the interactive content. Alternatively, the server 606 determines whether an interactive content may be transmitted on the subsystem 628 due to bandwidth considerations. For example, if an interactive content is designed to require more bandwidth than a local subsystem 628 can provide, the server 606 also disables 700 the interactive content. Thus, in this embodiment, and as shown in FIG. 8, the server 606 maintains the bandwidth data of the local subsystem 628 in the database 644, and bandwidth data of the interactive content is either provided explicitly in a field of the interactive content code 300 or the bandwidth data is available through analysis of the application itself. If there is insufficient bandwidth, the server 606 disables 700 the application. Stripping the data from the signal may disable the interactive content. In cases where regulations forbid the stripping of data, the display of the original application may be disabled by inserting a new data field which will be used as a flag by the CPE 248 to ignore the transmitted data. If a lower bandwidth version exists, this condition is processed as discussed below.

If the server 606 determines that the interactive content should not be disabled, the server 606 also determines 740 at this point whether there are multiple versions of the interactive content in the database 644. If there are not, then the server 606 passes 708 the interactive content provided with the signal 601 to the CPE 248.

If at either decision point 740 or 744 the server 606 determines that there are multiple applications stored in the database 644 the server 606 determines 748 whether a local customized application is present in the database 644. As discussed above, a local customized application is an application that is designed for the geographic or demographic viewership of a local subsystem 628. In a preferred embodiment as shown in FIG. 8, the database 644, 648 has identification fields that identify the nature of different applications in the database. For example, in FIG. 8, interactive content ID222A is a local version of ID222, and ID174A is a digital version of ID 174. Both ID222 and ID174 are interactive content identifiers that would be present in interactive content code 300 or would be part of the interactive content itself. Thus, the server 606 will examine the database entry for a specific application, and if an identification field indicates that a corresponding local customized application is present, the server will next determine 750 if there are multiple transmission streams in the subsystem 628. For example, some cable headends provide both analog and digital video streams. In this embodiment, the server 606 may maintain a field that indicates whether or not the subsystem 628 provides multiple transmission streams. If there are not multiple streams, the server 606 replaces 712 the existing application with the local customized application as identified in the database 644, 648. The server 606 replaces an application by providing the new corresponding interactive content to the data insertion unit 608 to overwrite the existing interactive content with the new corresponding interactive content. If there are multiple streams, the server 606 places 754 the different versions of the local customized application into the appropriate streams for broadcast. Thus, the present invention allows targeted interactivity to be provided to end users, making the interactive content more effective and attractive to the end users than in conventional systems.

If the server 606 determines that there are no local customized applications in the database, the server 606 also determines 752 whether the local subsystem 628 had multiple transmission streams. If there are multiple transmission streams, the server 606 places 720 the corresponding high bandwidth application identified in the database 644 in the high bandwidth stream and places or allows to pass through a low-bandwidth application in the low bandwidth stream. This allows a local subsystem 628 to tailor its interactive content to end users based on the end users's capabilities. If there is only one transmission stream, and in an embodiment in which a low bandwidth application is the application version transmitted on video signal 601 (which is the most common case to ensure the most universal applicability of an interactive content), the server 606 determines 756 whether a high bandwidth interactive content is present in the databases 644 that corresponds to the interactive content code being analyzed. If there is, the interactive broadcast server 606 replaces 712 the low bandwidth interactive content with a high bandwidth version of the application to take advantage of the high bandwidth capabilities of the local subsystem 628. If there is not a high bandwidth application present in the system, then the server 606 looks for other customized versions of the applications and processes 724 those applications responsive to their conditions. The above order of processing is merely exemplary, as decisions can be made in different orders within the scope of the present invention.

The foregoing describes in details the features and benefits of the present in various embodiments. Those of skill in the art will appreciate that present invention is capable of various other implementations that operate in accordance with the foregoing principles and teachings. For example, the arrangement and organization of the broadcast and local subsystem facility hardware may differ and the interactive preservation technology can be located in the appropriate position in accordance with the teachings described herein to achieve the described results and benefits. Certainly, the names of the various entities may be changed without impacting their functional operations. Accordingly, this detailed description is not intended to limit the scope of the present invention, which is to be understood by reference the claims below.

The invention claimed is:

1. A system for providing interactive content comprising:
hardware adapted to receive one or more first video streams that include video data, first interactive content and an interactive content code, wherein the interactive content code includes an option field, and wherein the hardware is further to produce a second video stream;
an interactive content code detector adapted to detect the interactive content code and the option field therein, and based on the value of the option field, to produce a control signal to indicate the first interactive content is to be replaced with second interactive content; and
a data insertion unit adapted to receive the control signal and to insert the second interactive content into the second video stream to produce a third video stream.

2. The system of claim 1 wherein the data insertion unit is positioned to insert interactive content into the second video stream prior to the third video stream being transmitted to a transmission source, causing the second interactive content to remain in the third video stream upon transmission.

3. The system of claim 1 wherein a video stream generator generates the first video stream, and the interactive content code detector is coupled to an output of the video stream generator.

4. The system of claim 1 wherein the interactive content code is received in a different stream from a stream used to carry the video data.

5. The system of claim 1 in which the interactive content code detector and the data insertion unit are coupled to a same point in the transmission path.

6. The system of claim 5 wherein the interactive content code is a universal resource locator and the data insertion unit inserts an interactive content corresponding to the universal resource locator.

7. The system of claim 1, wherein the interactive content code is located in a vertical blanking interval of the one or more first video streams, and wherein the interactive content code detector includes a vertical blanking interval line reader.

8. A method for providing interactive content in a broadcast facility that transmits a video broadcast stream containing video along a transmission path for delivery to end users and contains equipment that may corrupt interactive content, the method comprising:
   encrypting an interactive content code to include with first interactive content, resulting in an encrypted interactive content code wherein the interactive content code includes an option field;
   inserting the encrypted interactive content code into a first video stream based on a value of the option field, resulting in a second video stream with embedded interactivity, wherein the encrypted interactive content code specifies second interactive content to replace the first interactive content;
   processing the second video stream, to produce a third video stream; and
   inserting the second interactive content corresponding to the interactive content code into the third video stream, to produce a fourth video stream, which includes the second interactive content and the encrypted interactive content code.

9. The method of claim 8 wherein inserting an interactive content further comprises inserting an interactive content corresponding to the interactive content code at a point in the transmission path after a last point in the transmission path where the interactive content may be corrupted.

10. The method of claim 8, further comprising reading the encrypted interactive content code at a point in the transmission path prior to an interactive content in the second video stream being corrupted.

11. The method of claim 8 wherein the embedded interactive content code is inserted into a region of the second video stream that is preserved by the broadcast facility.

12. The method of claim 8, further comprising reading the encrypted interactive content code, wherein the interactive content is inserted into the third video stream at a same point in the transmission path at which the encrypted interactive content code is read.

13. The method of claim 12, further comprising reading the encrypted interactive content code, wherein the encrypted interactive content code is read at a point in the transmission path after which broadcast facility equipment that may corrupt an interactive content is coupled to the transmission path.

14. A method for providing interactive content in a broadcast facility that transmits a video broadcast stream containing video for delivery along a transmission path to end users and contains equipment that may corrupt interactive content, the method comprising:
   encrypting an interactive content code, resulting in an encrypted interactive content code wherein the interactive content code is encrypted in a manner to prevent ad skipping and includes an option field;
   inserting the encrypted interactive content code into a first video stream including first interactive content, resulting in a second video stream with embedded interactivity, wherein the interactive content code specifies second interactive content to accompany a video broadcast based on the value of the option field, and wherein the encrypted interactive content code is inserted into a region of the second video stream that is preserved by the broadcast facility;
   processing the second video stream, to produce a third video stream; and
   inserting the second interactive content based on the interactive content code and the option value into the third video stream at a point in the transmission path after a point in the transmission path where broadcast facility equipment that may corrupt the interactive content is coupled to the transmission path, to produce a fourth video stream.

15. The method of claim 14 wherein inserting the encrypted interactive content code further comprises inserting a plurality of encrypted interactive content codes in different regions of the second video signal.

16. The method of claim 15 wherein at least one of the different regions is preserved by at least one local subsystem.

17. A method for providing interactive content in a broadcast facility that transmits a video stream containing video for delivery along a transmission path to end users, the method comprising:
   inserting an encrypted reference to second interactive content into a region of a first video stream including first interactive content, wherein the encrypted reference is encrypted in a manner to prevent ad skipping and includes an option field, and wherein the region is preserved by the broadcast facility, resulting in a second video stream with embedded interactivity;
   processing the second video stream, to produce a third video stream; and
   inserting the second interactive content based on the encrypted reference and the option field into the third video stream, to produce a fourth video stream.

18. The method of claim 17 wherein inserting the encrypted reference further comprises inserting an encrypted Universal Resource Locator, which includes a link to the second interactive content, into the region of the first video stream that is preserved by the broadcast facility.

19. A system for providing interactive content comprising:
   hardware adapted to receive a first video stream that includes video data, first interactive content, and one or more encrypted interactive content codes, and to produce a second video stream, wherein each encrypted interactive content codes is encrypted in a manner to prevent ad skipping and include an option field;
   an interactive content code detector, coupled to the first video stream, adapted to detect one or more interactive content codes identified within the one or more encrypted interactive content codes and to produce a control signal responsive to detecting and processing an interactive content code and its associated option field; and a data insertion unit, coupled to the interactive content code detector, adapted to receive the control signal and to insert second interactive content into the second video stream responsive to information contained in the control signal, resulting in a third video stream to be transmitted to one or more local subsystems, wherein the data insertion unit is positioned to insert interactive content into the second video stream prior to the third video stream being transmitted to a transmission source, causing the interactive content to remain in the third video stream upon transmission.

20. A system for providing interactive content comprising:
local equipment, adapted to receive one or more first signals from a broadcast facility, wherein the one or more first signals include video data, first interactive content, and one or more encrypted interactive content codes, wherein the one or more encrypted interactive content codes are encrypted in a manner to prevent ad skipping and include an option field, and wherein the local equipment is further to produce a first video stream;
an interactive content detection unit adapted to detect an interactive content code identified within an encrypted interactive content code and to transmit a control signal responsive to detecting and processing the interactive content code and the option field; and
a data insertion unit, coupled to the interactive content code detector, adapted to receive the control signal and to insert second interactive content into the first video stream responsive to information contained in the control signal, resulting in a second video stream.

21. The system of claim 20 wherein the data insertion unit is positioned to insert interactive content into the first video stream prior to the second video stream being transmitted to customer premise equipment, causing the interactive content to remain in the second video stream upon transmission.

22. The system of claim 20 in which the interactive content code detector and the data insertion unit are coupled to a same point in the transmission path.

23. The system of claim 20 wherein the interactive content code is a universal resource locator and the data insertion unit inserts an interactive content corresponding to the universal resource locator.

24. The system of claim 20, wherein the interactive content code detector is a vertical blanking interval reader.

25. A method of ensuring reliable delivery of interactive content comprising:
inserting a plurality of encrypted interactive content codes including corresponding option fields into different regions of data in a video stream to be broadcast to a plurality of local subsystems, wherein the interactive content codes correspond to an interactive content to be inserted into the video stream based on values associated with respective option fields, wherein the plurality of encrypted interactive content codes is encrypted in a manner to prevent ad skipping, and wherein each region of data is preserved by at least one local subsystem.

26. A method of ensuring reliable delivery of interactive content comprising:
inserting an encrypted interactive content code into a closed caption region of a video stream, wherein a first portion of the interactive content code corresponds to second interactive content to be inserted into the video stream to replace first interactive content and a second portion of the interactive content code includes an option field composed of conditions for replacing the first interactive content with the second interactive content, and wherein the closed caption region is preserved by at least one local subsystem.

27. A method of increasing a reliability for delivery of interactive content, the method comprising:
inserting an encrypted interactive content code into a first component of a first signal alternate to a second component, which includes first interactive content and is used to convey the first interactive content, wherein the encrypted interactive content code is encrypted in a manner to prevent ad skipping and includes an option field;
processing the first signal, to produce a second signal;
detecting an interactive content code and the option field identified by the encrypted interactive content code in the first signal; and
inserting second interactive content corresponding to the interactive content code into the second signal and based on a value of the option field, to produce a third signal.

28. The method of claim 8, wherein encrypting the interactive content code comprises disarranging elements of the interactive content code to produce a scrambled interactive content code.

29. A method comprising:
receiving a first video stream, the first video stream including video data, first interactive content, and an interactive content code;
generating a second video stream based on the first video stream;
detecting an option field in the interactive content code;
based on a value of the option field, selectively replacing the first interactive content in the second video stream with second interactive content to produce a third video stream; and
transmitting the third video stream to a destination.

30. The method of claim 29, wherein the interactive content code is present in a region in the first video stream that is preserved by a broadcast facility.

31. The method of claim 30, wherein the interactive content code is present in a vertical blanking interval of the first video stream.

32. The method of claim 29, wherein the interactive content code is a universal resource locator.

* * * * *

UNITED STATES PATENT AND TRADEMARK OFFICE
CERTIFICATE OF CORRECTION

PATENT NO. : 7,631,338 B2  Page 1 of 1
APPLICATION NO. : 09/754650
DATED : December 8, 2009
INVENTOR(S) : Del Sesto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 933 days.

Signed and Sealed this

Twenty-first Day of December, 2010

David J. Kappos
*Director of the United States Patent and Trademark Office*